(12) United States Patent
Jang et al.

(10) Patent No.: US 10,322,938 B2
(45) Date of Patent: Jun. 18, 2019

(54) POLY-SILICON MANUFACTURING APPARATUS AND METHOD USING HIGH-EFFICIENCY HYBRID HORIZONTAL REACTOR

(71) Applicant: LG CHEM, LTD., Seoul (KR)

(72) Inventors: Eunsu Jang, Daejeon (KR); Yoo Seok Kim, Daejeon (KR); Jeong Kyu Kim, Daejeon (KR); JinHyoung Yoo, Daejeon (KR); JungWoo Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 245 days.

(21) Appl. No.: 15/508,370

(22) PCT Filed: Jul. 3, 2015

(86) PCT No.: PCT/KR2015/006879
§ 371 (c)(1),
(2) Date: Mar. 2, 2017

(87) PCT Pub. No.: WO2016/052841
PCT Pub. Date: Apr. 7, 2016

(65) Prior Publication Data
US 2017/0283266 A1    Oct. 5, 2017

(30) Foreign Application Priority Data
Sep. 29, 2014    (KR) .................. 10-2014-0129908

(51) Int. Cl.
*B01J 12/00*    (2006.01)
*C01B 33/03*    (2006.01)
*C01B 33/035*    (2006.01)

(52) U.S. Cl.
CPC ............ *C01B 33/03* (2013.01); *B01J 12/005* (2013.01); *B01J 12/007* (2013.01); *C01B 33/035* (2013.01)

(58) Field of Classification Search
CPC ...... C01B 33/03; C01B 33/035; B01J 12/005; B01J 12/007
See application file for complete search history.

(56) References Cited

U.S. PATENT DOCUMENTS 7,264,782 B2    9/2007   Nougier et al.
2012/0192789 A1   8/2012   Kramer et al.

FOREIGN PATENT DOCUMENTS

KR    10-2012-0135640 A    12/2012
KR    10-2013-0019182 A    2/2013
(Continued)

*Primary Examiner* — Melvin C. Mayes
*Assistant Examiner* — Michael Forrest
(74) *Attorney, Agent, or Firm* — Dentons US LLP

(57) ABSTRACT

According to the present invention, there is provided a polysilicon production apparatus including: a horizontal reaction tube having an inlet port through which gaseous raw materials including reactant gases and a reducing gas are supplied, an outlet port through which residual gases exit, a reaction surface with which the gaseous raw materials come into contact, and bottom openings through which molten polysilicon produced by the reactions of the gaseous raw materials is discharged; and first heating means adapted to heat the reaction surface of the horizontal reaction tube. The horizontal reaction tube includes reaction regions consisting of first reaction regions where polysilicon is deposited and second reaction regions where reaction by-products are converted to the reactant gases. The first reaction regions are connected in series with the second reaction regions. Also provided is a polysilicon production method using the polysilicon production apparatus.

20 Claims, 3 Drawing Sheets

(56) References Cited

FOREIGN PATENT DOCUMENTS

| KR | 10-2013-0039486 A | 4/2013 |
|---|---|---|
| KR | 10-2013-0097240 A | 9/2013 |

[Fig. 1]
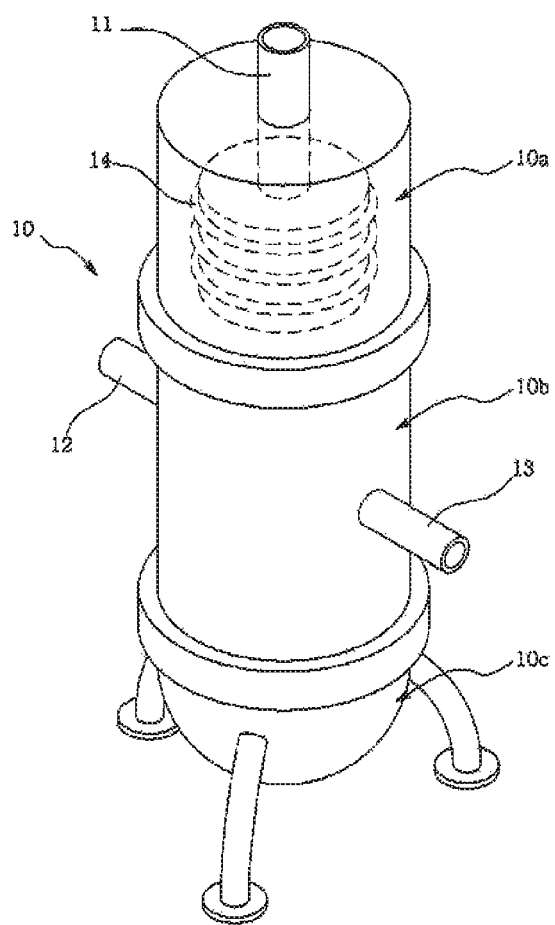
—PRIOR ART—

[Fig. 2]
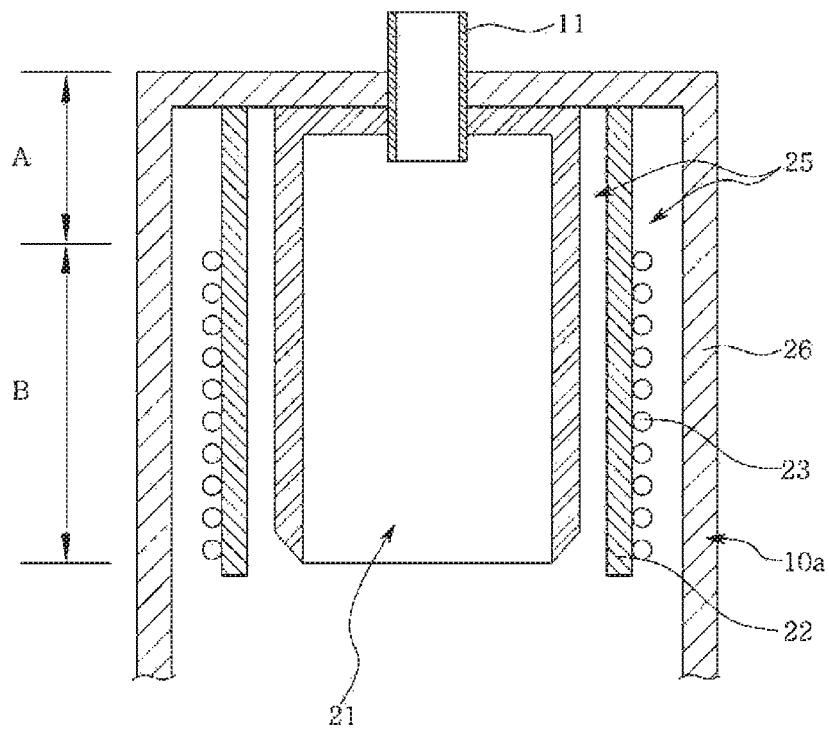
—PRIOR ART—
[Fig. 3]
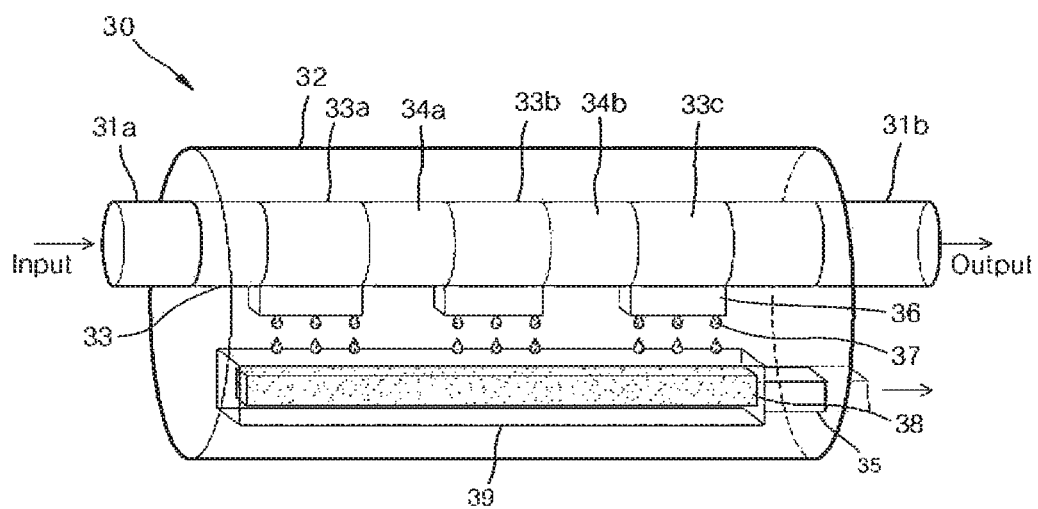

[Fig. 4]
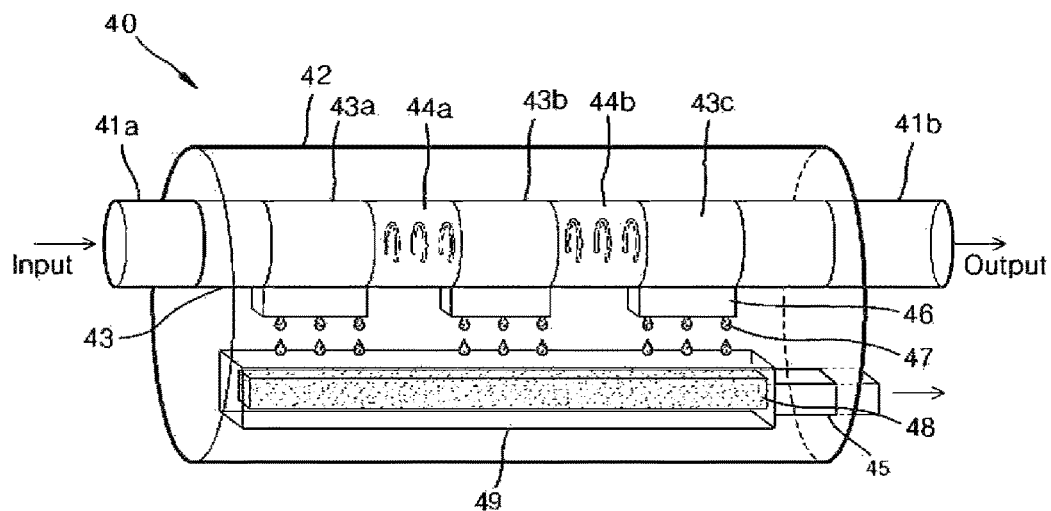
[Fig. 5]
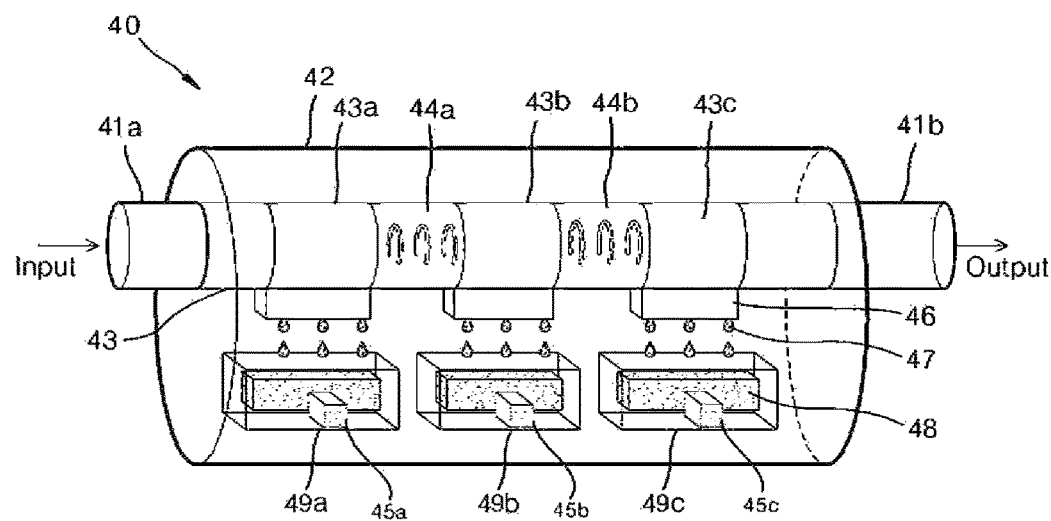

POLY-SILICON MANUFACTURING APPARATUS AND METHOD USING HIGH-EFFICIENCY HYBRID HORIZONTAL REACTOR

This application is a National Stage Entry of International Application No. PCT/KR2015/006879, filed on Jul. 3, 2015, and claims the benefit of Korean Application No. 10-2014-0129908, filed on Sep. 29, 2014, all of which are hereby incorporated by reference in their entirety for all purposes as if fully set forth herein.

BACKGROUND OF THE INVENTION

1. Field of the Invention

The present invention relates to a polysilicon production apparatus and method, and more specifically to an apparatus and method for the production of polysilicon using a horizontal reactor.

2. Description of the Related Art

In recent years, there has been a growing demand for polysilicon as a raw material in the fabrication of electronic devices, such as semiconductor devices and photovoltaic devices. Many methods are known for the production of silicon as a raw material in the fabrication of semiconductors or solar photovoltaic cells and some of them have already been carried out industrially.

Currently commercially available high-purity polysilicon is typically produced by chemical vapor deposition processes. Specifically, polysilicon can be produced by reacting trichlorosilane gas with a reducing gas, such as hydrogen gas, as depicted in Reaction 1:

$SiHCl_3$ (gas)+$H_2$ (gas)→Si (solid)+3HCl (gas)

$SiH_2Cl_2$→Si+2HCl $SiCl_4$+$2H_2$→Si+4HCl $SiH_4$→Si+$2H_2$     [Reaction 1]

The Siemens method is an exemplary commercially available polysilicon production method. According to the Siemens method, silane gases as reactant gases and hydrogen gas as a reducing gas are fed into a bell-jar reactor and a silicon rod placed in the bell-jar reactor is heated to or above the deposition temperature of silicon. When transferred to the reactant gases and the reducing gas, the heat reduces the reactant gases to deposit polysilicon.

However, the Siemens reactor consumes much energy, commonly an electrical energy of about 65 to about 200 KWh/kg. This electrical energy cost accounts for a very large portion of the total polysilicon production cost. Another problem is that the batch type deposition requires extremely laborious processes, including silicon rod installation, ohmic heating, deposition, cooling, extraction, and bell-jar reactor cleaning.

Another method is associated with the deposition of polysilicon using a fluidized bed. According to this method, a silane is supplied simultaneously with the supply of fine silicon particles having a size of about 100 microns as deposition nuclei to deposit silicon on the fine silicon particles, and as a result, silicon grains having a size of 1 to 2 mm are continuously produced. This method is advantageous in that continuous operation is possible for a relatively long time. However, due to its low deposition temperature, monosilane as a silicon source is thermally decomposed even at a low temperature, tending to form finely-divided silicon or deposit silicon on the reactor wall. Thus, regular cleaning or exchange of the reaction vessel is required.

An apparatus for producing polycrystalline silicon using a vertical reduction reactor is disclosed in Korean Patent No. 10-0692444. The apparatus uses a heater on which silicon is deposited. The heater is cylindrically shaped for high thermal efficiency. Specifically, the apparatus includes (a) a cylindrical vessel having an opening which is a silicon take-out port at the lower end, (b) a heater for heating the inner wall from the lower end to a desired height of the cylindrical vessel at a temperature equal to or higher than the melting point of silicon, (c) a chlorosilane feed pipe which is composed of an inner pipe having a smaller outer diameter than the inner diameter of the cylindrical vessel and constituted such that one opening of the inner pipe faces down in a space surrounded by the inner wall heated at a temperature equal to or higher than the melting point of silicon, and (d) a first seal gas feed pipe for supplying seal gas into a gap defined by the inner wall of the cylindrical vessel and the outer wall of the chlorosilane feed pipe. The apparatus optionally further includes (e) a hydrogen gas feed pipe for supplying hydrogen gas into the above cylindrical vessel.

FIG. 1 schematically illustrates a polysilicon production apparatus that is of a vertical reduction reactor type.

Referring to the figure, the polysilicon production apparatus includes a reactant gas inlet port 11 disposed in an upper portion 10a of a reactor 10, a vacuum pipe 12 disposed at one side of a middle portion 10b of the reactor 10, and an outlet pipe 13 disposed at the other side of the reactor 10. Units for collecting, cooling, and casting molten silicon are disposed in a lower portion 10c of the reactor 10.

Silane gases as reactant gases are supplied through the inlet port 11. The silane gases may be monosilane, dichlorosilane, trichlorosilane (TCS) or tetrachlorosilane (STC). After operation of the reactor 10, the vacuum pipe 12 can be used to create a vacuum for cleaning and purging the internal space of the reactor 10 and the outlet pipe 13 can be used to release waste gases generated during the reactions. An induction heating coil 14 is provided in the upper portion 10a of the reactor 10. When an RF current is applied to the induction heating coil 14, an eddy current is generated in a reaction tube 21 to release heat. This heat is applied to the gases entering through the gas inlet port and the wall surface of the reaction tube 21 to induce the deposition of polysilicon.

FIG. 2 is a schematic cross-sectional view of the upper portion 10a of the reactor illustrated in FIG. 1.

Referring to the figure, the reaction tube 21 is provided in the upper portion 10a of the reactor and the reactant gases, such as silane gases, are supplied to the reaction tube 21 through the reactant gas supply port 11. A heating coil 23 is arranged on the surface of an insulating tube 22 provided outside the reaction tube 21. A sealing gas 25 is supplied through a sealing gas supply pipe (not shown) and is filled between the reaction tube 21 and the insulating tube 22 and between the insulating tube 22 and an outer vessel 26. The sealing gas 25 serves to prevent the reactant gases from leaking through gaps between the reaction tube 21 and the insulating tube 22 and between the insulating tube 22 and the outer vessel 26. A reducing gas, such as hydrogen, is supplied through a reducing gas supply pipe (not shown). The reducing gas may be supplied in admixture with the silane gases.

As illustrated in the cross-sectional view of FIG. 2, the heating coil 23 is not wound in an upper region "A" of the reaction tube 21 but is wound in a lower region "B" of the reaction tube 21. This structure ensures thermal stability and substantially isothermal distribution of the reaction tube. The region "B" is required to have a length 3 to 4 times larger than the diameter of the reaction tube.

Thus, heat transferred from the heating coil 23 to the reaction tube 21 is concentrated on the lower region "B" rather than on the upper region "A". However, the polysilicon production apparatus illustrated in FIGS. 1 and 2 has the problem that large amounts of the reactant gases and the reducing gas entering the reaction tube 21 pass through the reaction tube without coming into contact with the wall surface of the reaction tube 21, and as a result, sufficient deposition does not take place at high temperature.

That is, since heat is not sufficiently transferred to the gases flowing through the central portion of the reaction tube 21 farthest away from the heating coil 23, slow reduction reactions take place, leading to low overall production efficiency and energy efficiency.

SUMMARY OF THE INVENTION

One object of the present invention is to provide an improved polysilicon production apparatus and method that eliminate the problems encountered in the prior art.

A further object of the present invention is to provide an apparatus and method for producing polysilicon with high efficiency.

According to one aspect of the present invention, there is provided a polysilicon production apparatus including: a horizontal reaction tube positioned in an insulated tube and having an inlet port through which gaseous raw materials including reactant gases and a reducing gas are supplied, an outlet port through which residual gases exit, a reaction surface with which the gaseous raw materials come into contact, and bottom openings through which molten polysilicon produced by the reactions of the gaseous raw materials is discharged; and first heating means adapted to heat the reaction surface of the horizontal reaction tube wherein the horizontal reaction tube includes reaction regions consisting of first reaction regions where polysilicon is deposited and second reaction regions where reaction by-products are converted to the reactant gases, the first reaction regions being connected in series with the second reaction regions.

According to one embodiment, the reaction temperature of the first reaction regions may be controlled independently from that of the second reaction regions.

According to one embodiment, the apparatus may further include a container adapted to collect the molten polysilicon discharged through the bottom openings of the horizontal reaction tube.

Each of the second reaction regions may further have an opening through which a reducing gas is supplied.

The reactant gases may include trichlorosilane (TCS) and the reaction by-products may include one or more of monosilane, monochlorosilane, dichlorosilane (DTC), and tetrachlorosilane (STC). The reducing gas may include hydrogen.

According to one embodiment, the bottom openings of the horizontal reaction tube may be formed in the first reaction regions.

The first reaction regions and the second reaction regions of the horizontal reaction tube are alternately arranged and the last reaction region is occupied by the first reaction region.

The second reaction regions may include a catalyst capable of promoting the conversion of the reaction by-products to the reactant gases.

The catalyst may be Si, SiC or a mixture thereof that provides no impurities during polysilicon deposition.

When the second reaction regions include a catalyst, internal structures are placed in the second reaction regions to provide additional reaction surfaces such that the contact area with the catalyst is increased.

According to one embodiment, the polysilicon collection container may include second heating means adapted to maintain the collected polysilicon in a molten state or may maintain the collected polysilicon in a solid state without the need for additional heating means.

The reaction surface may be either the inner or outer surface of the horizontal reaction tube or both.

The polysilicon may be discharged in the form of droplets through the bottom openings and may be collected in the collection container.

Both the horizontal reaction tube and the polysilicon collection container may be positioned in the insulated tube.

According to a further aspect of the present invention, there is provided a polysilicon production method including: feeding gaseous raw materials including reactant gases and a reducing gas into a first reaction region of a horizontal reaction tube, which is positioned in an insulated tube and has reaction regions consisting of first reaction regions where polysilicon is deposited and second reaction regions where reaction by-products are converted to the reactant gases, the first reaction regions being connected in series with the second reaction regions, through a gas inlet port; heating the first reaction regions of the horizontal reaction tube to the reaction temperature of the gaseous raw materials to deposit polysilicon; converting by-products of the reactions in the first reaction regions to the reactant gases in the second reaction regions and allowing the reactant gases to participate in polysilicon deposition; and discharging the deposited polysilicon in the form of droplets through bottom openings of the horizontal reaction tube.

The method may further include collecting the discharged polysilicon in the form of droplets in a collection container.

The method may further include heating the collection container to maintain the collected polysilicon in a liquid state or maintaining the polysilicon collected in the collection container in a solid state.

The first reaction regions may be heated to a temperature suitable for polysilicon deposition and the second reaction regions may be heated to a temperature suitable for the conversion of reaction by-products, the two temperatures being controlled independently from each other.

The method may include supplying an additional reducing gas to the second reaction regions for the conversion of the reaction by-products in the absence of a catalyst or supplying a catalyst to the second reaction regions for the conversion of the reaction by-products.

As described above, the polysilicon production apparatus and method of the present invention use a horizontal reaction tube, unlike conventional apparatuses and methods using vertical reactors. The use of the horizontal reaction tube increases the contact area of a reaction surface for the reactions of gaseous raw materials, leading to an increase in silicon conversion and facilitating control over the temperature of the reaction surface. According to the present invention, molten silicon can be collected and supplied to a downstream process. This can reduce the quantity of energy necessary for silicon remelting and can contribute to energy saving by thermal supplement between the overlying horizontal reaction tube and an underlying collection container. In addition, a plurality of reaction regions, in each of which temperature, gaseous raw materials, and by-products can be independently controlled, are set, contributing to an enhancement of polysilicon deposition efficiency.

BRIEF DESCRIPTION OF THE DRAWINGS

FIG. 1 is a schematic perspective view of a polysilicon production apparatus according to the prior art.

FIG. 2 is a cross-sectional view schematically illustrating an upper portion of the reactor illustrated in FIG. 1.

FIG. 3 is a schematic view illustrating the construction of a polysilicon production apparatus according to one embodiment of the present invention.

FIG. 4 is a schematic view illustrating the construction of a polysilicon production apparatus according to a further embodiment of the present invention.

FIG. 5 is a schematic view illustrating the construction of a polysilicon production apparatus according to another embodiment of the present invention.

DETAILED DESCRIPTION OF THE INVENTION

The present invention will now be described in more detail with reference to embodiments illustrated in the accompanying drawings. However, this is not intended to limit the present invention to particular modes of practice, and it is to be appreciated that all changes, equivalents, and substitutes that do not depart from the spirit and scope of the present invention are encompassed in the present invention.

Like reference numerals refer to the like elements throughout the drawings.

Although the terms "first", "second", "A", "B", etc. may be used to describe various elements, such elements must not be limited to the above terms. The above terms are used only to distinguish one element from another.

The term "and/or" includes any and all combinations of one or more of the associated listed items.

It will be understood that when an element is referred to as being "connected" or "coupled" to another element, it can be directly connected or coupled to the another element or intervening elements may be present.

As used herein, an expression used in the singular encompasses the expression of the plural, unless the context clearly indicates otherwise.

The terms "comprises", "comprising", "includes", "including", "has", "having", etc. are intended to indicate the existence of features, numbers, steps, operations, elements, components or combinations thereof disclosed in the specification, and are not intended to preclude the possibility that one or more other features, numbers, steps, operations, elements, components or combinations thereof may exist or may be added.

The present invention provides a polysilicon production apparatus including: a horizontal reaction tube positioned in an insulated tube and having an inlet port through which gaseous raw materials including reactant gases and a reducing gas are supplied, an outlet port through which residual gases exit, a reaction surface with which the gaseous raw materials come into contact, and bottom openings through which molten polysilicon produced by the reactions of the gaseous raw materials is discharged; and first heating means adapted to heat the reaction surface of the horizontal reaction tube wherein the horizontal reaction tube includes reaction regions consisting of first reaction regions where polysilicon is deposited and second reaction regions where reaction by-products are converted to the reactant gases, the first reaction regions being connected in series with the second reaction regions.

FIG. 3 schematically illustrates the construction of a polysilicon production apparatus according to one embodiment of the present invention.

Referring to the figure, the polysilicon production apparatus 30 includes a horizontal reaction tube 33 positioned in an insulated tube 32 and having an inlet port 31a through which gaseous raw materials including reactant gases and a reducing gas are supplied, an outlet port 31b through which residual gases exit, a reaction surface with which the gaseous raw materials come into contact, and bottom openings 36 through which molten polysilicon produced by the reactions of the gaseous raw materials is discharged; and first heating means (not illustrated) adapted to heat the reaction surface of the horizontal reaction tube 33 wherein the horizontal reaction tube 33 includes reaction regions consisting of first reaction regions 33a, 33b, and 33c where polysilicon is deposited and second reaction regions 34a and 34b where reaction by-products are converted to the reactant gases, the first reaction regions being connected in series with the second reaction regions.

The horizontal reaction tube may further include a container 39 adapted to collect the molten polysilicon 37 discharged through the bottom openings 36. The collection container 39 is not necessary and may be removed.

The reactant gases may include one or more of monosilane, monochlorosilane, dichlorosilane (DCS), trichlorosilane (TCS), and tetrachlorosilane (STC), typically trichlorosilane, and the reducing gas may include hydrogen.

As illustrated in FIG. 3, the horizontal reaction tube of the polysilicon production apparatus according to the present invention is divided into a plurality of reaction regions consisting of first reaction regions where silicon is produced exclusively and second reaction regions where by-products are converted to the reactant gases. The reaction conditions (e.g., reaction temperatures) of each reaction region can be controlled such that the silicon deposition efficiency is further enhanced.

The heating means may be independently provided in the first reaction regions and the second reaction regions to independently control the reaction temperatures of the reaction regions. For example, the reaction conditions can be controlled depending on the amount of by-products produced as the reactions of the silicon-containing reactant gases and the reducing gas proceed. Specifically, the following deposition reaction may mainly occur in the first reaction regions:

$$4SiHCl_3 + H_2 \rightarrow Si(s) + SiHCl_3 + SiCl_4 + SiH_2Cl_2 + 3HCl$$

The following conversion reactions may mainly occur in the second reaction regions:

$$SiCl_4 + H_2 \rightarrow SiHCl_3 + HCl$$

$$SiH_2Cl_2 + SiCl_4 \leftrightarrow 2SiHCl_3$$

When a catalyst is used for the conversion reactions in the second reaction regions, the following reactions may proceed:

$$3SiCl_4 + 3H_2 + Si \rightarrow 4SiHCl_3 + H_2$$

$$Si + 3HCl \rightarrow SiHCl_3 + H_2$$

The catalyst is preferably Si, SiC or a mixture thereof that provides no impurities during polysilicon deposition while providing surfaces where the conversion reactions to trichlorosilane can be promoted.

The reaction in the first reaction regions is controlled to conditions advantageous for the conversion of trichlorosilane (TCS) to Si(s) and the reactions in the second reaction regions are controlled to conditions advantageous for the conversion of tetrachlorosilane (STC) and/or dichlorosilane (DCS) to TCS, resulting in an increase in the overall silicon deposition efficiency.

Depending on the characteristics of the main reactions in the reaction regions, the first reaction regions and the second reaction regions are also referred to as "deposition regions" and "conversion regions", respectively.

One or more combinations of the first reaction regions and the second reaction regions may be repeated. Specifically, the first reaction regions and the second reaction regions are alternately arranged and the last reaction region is preferably occupied by the first reaction region. The arrangement of the reaction regions will be explained with reference to the apparatus illustrated in FIG. 3. Reactant gases and a reducing gas are supplied through the inlet port 31a and react with each other in the primary deposition region (first reaction region: 33a). As a result of the reaction, silicon is deposited and by-products, including STC and DCS, are produced. TCS is a major component in the reactant gases. The by-products (STC, DCS, etc.) produced as a result of the side reactions are sent to the primary conversion region (second reaction region: 34a) where they are converted to TCS. The obtained TCS is sent to the secondary deposition region (first reaction region: 33b) where silicon is deposited and by-products, including STC, are produced. The by-product STC produced in the secondary deposition region (first reaction region: 33b) is sent to the secondary conversion region (second reaction region: 34b) where it can be converted to TCS. The obtained TCS is sent to the tertiary deposition region (first reaction region: 33c) where silicon can be deposited.

As such, the last reaction region of the horizontal reaction tube is occupied by the first reaction region. With this arrangement, TCS converted from the by-products, such as STC, can be used up in the reaction for polysilicon deposition, resulting in an increase in polysilicon deposition efficiency.

The conversion efficiency of STC to TCS in the conversion regions of reaction tube may be lower than that of the conversion reaction for exhaust gas treatment. In view of this, the numbers of the first and second reaction regions connected in series can be appropriately controlled.

Silicon is substantially deposited at the initial stages of the reactions of the gaseous raw material fed into the primary deposition region. In view of this, the relative size (length) of the deposition regions (first reaction regions) and the conversion regions (second reaction regions) can be controlled. For example, the ratio of the length of the deposition regions to the length of the conversion regions may be adjusted to the range of 1:1 to 1:10, but is not limited to this range.

The temperatures of the first and second reaction regions can be controlled in an integrated manner or individually. For example, the first and second reaction regions may be heated directly or indirectly by induction heating or resistance heating. However, the heating mode is not particularly limited.

An appropriate amount of an additional reducing gas necessary for the conversion reactions in the second reaction regions may be supplied to the second reaction regions to promote the conversion to TCS. To this end, inlet ports (not illustrated) through which the additional reducing gas is supplied may be formed in one or more of the second reaction regions.

Generally, the deposition reaction of polysilicon from TCS proceeds at about 1,400° C. or higher. Thus, by-products in the deposition reaction may be supplied at a temperature as high as about 1,400° C. to the conversion regions. The conversion reactions proceed at temperatures of about 1000° C. or lower. The supply of the additional reducing gas is effective in cooling the second reaction regions, which is also advantageous in that the temperature of the second reaction regions can be reduced to an appropriate level.

According to a further embodiment of the present invention, a catalyst may be filled in the second reaction regions to promote the conversion of STC to TCS. Also in this embodiment, the reaction temperature reaches about 1000° C. The temperature of gases released from the deposition regions exceeds about 1000° C., which can be used for the conversion of STC. Since the temperature of gases released from the conversion regions is about 1000° C., heating is required for the deposition reaction but the quantity of energy necessary for the heating can be reduced.

Even when a hybrid conversion process based on hydrochlorination is carried out in the second reaction regions, the reaction temperature is about 600° C. or more. The high reaction temperature can contribute to energy saving by thermal supplement between the upstream and downstream regions, as in the catalytic reaction. As used herein, the hybrid conversion process refers to a process for STC conversion by the supply of hydrogen as a reducing gas. The hybrid conversion process can be carried out without a catalyst at about 600° C. to about 650° C.

In the horizontal reaction tube, the first reaction regions can be separated from the second reaction regions by structures acting as thermal barriers by which the temperature of the first reaction regions differs by hundreds of ° C. from that in the second reaction regions. The structures can partially block the gas flow.

According to a further embodiment of the present invention, the second reaction regions may include a catalyst. In this embodiment, internal structures may be placed in the second reaction regions to provide additional reaction surfaces. The internal structures increase the contact area with the catalyst to promote the reactions. The internal structure may have various shapes, for example, rods, meshes, and reversed "U" shapes. FIG. 4 illustrates the apparatus in which reversed U-shaped internal structures are mounted in the second reaction regions. The other elements of the apparatus of FIG. 4 are the same as those explained in the apparatus of FIG. 3 and their detailed explanation is omitted herein.

As illustrated in FIG. 3, the polysilicon collection container 39 or 49 is provided in one piece below the horizontal reaction tube. Although not illustrated, separate polysilicon collection containers may be provided at the positions corresponding to the deposition regions and the conversion regions.

In the case where the collection container is provided in one piece, a silicon discharge port 35 or 45 may be disposed at the rear of the collection container (see FIGS. 3 and 4). In the case where separate collection containers 49a, 49b, and 49c are provided at the positions corresponding to the unit reaction regions, as illustrated in FIG. 5, silicon discharge ports 45a, 45b, and 45c may be disposed at the lateral sides of the collection containers, i.e. in the direction perpendicular to the gas flow.

Polysilicon 38 collected in the polysilicon collection container 39 may also be maintained in a solid state in the polysilicon collection container but it is more preferred that the polysilicon collection container 39 further includes second heating means (not illustrated) to maintain the collected polysilicon 38 in a molten state.

According to a preferred embodiment of the present invention, both the horizontal reaction tube 33 and the polysilicon collection container 39 are arranged in the insulated tube 32, as illustrated in FIG. 3. This arrangement is preferred in that heat transfer with the outside can be blocked to prevent energy loss and heat can be supplemented by thermal interference between the horizontal reaction tube 33 and the polysilicon collection container 39 to achieve energy saving.

In the apparatus of the present invention, the bottom openings 36 are formed in the horizontal reaction tube 33. Due to this structure, the reactions of the gaseous raw materials may occur on either the inner or outer surface of the horizontal reaction tube 33 or both. When the reaction surface is heated to near the melting temperature of polysilicon, silicon is produced by the reactions of the silicon-containing reactant gases with the reducing gas and flows down in a molten state along the reaction surface.

According to one embodiment, the bottom openings of the horizontal reaction tube are preferably formed in the first reaction regions. In this embodiment, impurities from the second reaction regions can be prevented from being collected in the collection container 39.

The molten silicon flows down and is discharged in the form of droplets 37 through the bottom openings 36 of the horizontal reaction tube 33. The discharged molten silicon can be collected in the collection container 39.

The openings 36 are arranged in the reaction regions where the first heating means adapted to heat the reaction surface of the horizontal reaction tube 33 are provided. This arrangement is preferred for discharge of the molten silicon in the form of droplets.

Although not illustrated in the figure, the horizontal reaction tube 33 is placed parallel to the horizontal plane. Alternatively, the horizontal reaction tube 33 may be inclined at an angle relative to the horizontal plane such that the molten silicon remaining on the horizontal reaction tube flows down and is easily discharged through the openings 36.

The polysilicon production apparatus using the horizontal reaction tube is advantageous over vertical reaction apparatuses in that the reaction conditions, such as the temperatures and pressures of the reactant gases and the reducing gas, are easy to control.

According to a further aspect of the present invention, there is provided a polysilicon production method using the apparatus.

Specifically, the method of the present invention includes: feeding gaseous raw materials including reactant gases and a reducing gas into a first reaction region of a horizontal reaction tube, which is positioned in an insulated tube and has reaction regions consisting of first reaction regions where polysilicon is deposited and second reaction regions where reaction by-products are converted to the reactant gases, the first reaction regions being connected in series with the second reaction regions, through a gas inlet port; heating the first reaction regions of the horizontal reaction tube to the reaction temperature of the gaseous raw materials to deposit polysilicon; converting by-products of the reactions in the first reaction regions to the reactant gases in the second reaction regions and allowing the reactant gases to participate in polysilicon deposition; and discharging the deposited polysilicon in the form of droplets through bottom openings of the horizontal reaction tube.

According to one embodiment, the method may further include collecting the polysilicon in the form of droplets discharged through the bottom openings of the horizontal reaction tube in a collection container.

The collected polysilicon 38 may be maintained in a solid state in the polysilicon collection container 39 or may be in a molten state by heating the collection container.

The temperatures of the reaction regions of the horizontal reaction tube may be controlled independently. Specifically, the first reaction regions may be heated to a temperature suitable for polysilicon deposition and the second reaction regions may be heated to a temperature suitable for the conversion of reaction by-products, the two temperatures being controlled independently from each other.

The method may include supplying an additional reducing gas to one or more of the second reaction regions. This can ensure maximum silicon deposition efficiency.

The gaseous raw materials used in the method of the present invention may include silicon-containing reactant gases. For example, the silicon-containing reactant gases may include one or more silicon gases selected from monosilane, monochlorosilane, dichlorosilane (DCS), trichlorosilane (TCS), and tetrachlorosilane. The reducing gas typically includes hydrogen. As another example, the reducing gas may include Zn or Na. However, there is no particular restriction on the kind of the reducing gas.

In the polysilicon production method using the apparatus of the present invention, the temperature of the deposition regions may be adjusted to the range of 1400 to 2000° C., more preferably 1400 to 1800° C., for polysilicon melting. Within this range, molten silicon maintains its viscosity such that it easily moves to and drops from the bottom of the reaction tube. The temperature of the conversion regions may be adjusted to 600 to 1000° C. The method may be carried out at a process pressure of 1 to 5 atm.

For example, induction heating or resistance heating may be used as a heating source to heat the reaction tube to or above the melting temperature of silicon. Taking into consideration the structure of the reactor, it is preferred to directly heat the reaction tube by resistance heating. However, the heating mode is not particularly limited and induction heating is also possible. Specifically, the reaction tube (i.e. the reaction surface) and the underlying collection container can be heated individually by resistance heating. For induction heating, the form of an induction coil should be taken into consideration. In this case, the reaction tube and the underlying collection container are positioned in a single coil such that their temperatures can be controlled by the single coil.

No particular limitation is imposed on the materials for the reaction tube, the internal structures, the collection container, and the other elements of the apparatus according to the present invention. It is preferred to manufacture the reaction tube and the collection container using materials that are less reactive with the gaseous raw materials or molten polysilicon. Examples of such materials include carbon materials, such as graphite, glassy carbon, and polycarbonates, silicon carbide (SiC), silicon nitride ($Si_3N_4$), boron nitride (BN), SiC-coated graphite, molybdenum (Mo), tantalum (Ta), and quartz.

For example, the use of graphite may increase the risk of penetration of carbon (i.e. carburizing) into molten silicon, leading to low silicon purity. However, as the reactions proceed, the molten silicon reacts with the graphite on the surface of the reactor to form a SiC layer, which serves to prevent the carbon from penetrating into the silicon. Alternatively, a SiC layer-coated graphite vessel may be used or a quartz crucible may be introduced into the graphite vessel. In this case, impurities can be blocked from entering the silicon, which can maintain the silicon at high purity.

The polysilicon production apparatus of the present invention facilitates the production of molten polysilicon in high purity. Thus, the molten silicon can be fed into a mold (not illustrated) in a casting region disposed downstream of the apparatus and cooled to obtain a lump of cast polysilicon. Alternatively, the polysilicon may be stored in a liquid state before use in a subsequent process.

After the reactions, waste gases can be recovered. The recovered waste gases can be separated and converted to reactant gases in separate processes. The obtained reactant gases can be recycled for silicon deposition.

The present invention employs a horizontal reaction tube instead of a bell-jar reactor. The use of the horizontal reaction tube facilitates control over the reaction area and the retention time of gaseous raw materials in the reactor, leading to the production of polysilicon with high efficiency.

The opening portions for silicon recovery underlying the reaction tube have a larger heat sink area and a smaller heat radiating area and are more difficult to be thermally supplemented from the surroundings than the other portions of the reaction tube, increasing the risk that the silicon tends to coagulate with dropping temperature. That is, even when the temperature of the central portion of the reaction tube (i.e. the reaction surface) is equal to or higher than the melting temperature of silicon, the bottom temperature of the reaction surface drops to a temperature equal to or lower than the melting temperature of silicon. As a result, the molten silicon does not drop to the underlying container and coagulates in the reaction tube. This phenomenon may be continued to clog the bottom of the reaction surface.

When it is intended to maintain the bottom openings of a bell-jar reactor at a temperature equal to or higher than the melting temperature of silicon, the middle portion of the reactor is kept at a relatively high temperature, resulting in a large temperature difference (i.e. gradient). In a conventional silicon deposition method using silane gases, there is a risk that silicon dust may be produced by nucleation at high temperature. The silicon dust decreases the silicon deposition efficiency and may cause problems in a downstream process (i.e. waste gas recycling process). Further, the conventional method has difficulty in controlling the reactor temperature. In a general method for silicon production by CVD or VLD (including LLC), silicon deposited on the reaction surface by surface reactions of a reaction tube can be finally collected in a molten state in an underlying collection container. However, dust may be formed by silicon nucleation in a space of a specific high-temperature region in the reactor. The dust may not be adsorbed to the surface of the reaction tube and may be entrained in a gas flow and discharged with waste gases from the reaction tube. The discharge of the dust without recovery leads to low silicon production efficiency. The discharged silicon dust together with waste gases may cause problems in downstream processing units, such as exhaust gas lines.

When compared to a bell-jar reactor, the horizontal reaction tube used in the present invention has a small temperature gradient across the height thereof due to its short length in the vertical direction, making it easy to maintain the internal temperature of the reaction tube at a constant level. Due to this temperature control, enhanced conversion of gaseous raw materials to silicon can be expected.

The silicon collection container is positioned near the bottom of the reactor and silicon can be maintained in a liquid state in the collection container. This thermal supplement effect contributes to energy saving.

After the gaseous raw materials are charged into the reaction tube, conversion of the gaseous raw materials to silicon is substantially completed at the entrance of the reaction tube. In contrast, a bell-jar reactor requires a large quantity of energy to maintain silicon in a liquid state until silicon produced in the upper portion of a reaction tube flows down along the reaction surface, drops to the bottom of the reaction tube, and is collected in a collection container.

Although the silicon conversion is substantially completed in the front portion of the horizontal reactor immediately after charge, the formed liquid silicon should fall down a distance for recovery. This distance is shorter in the horizontal reactor than in the bell-jar reactor, causing less thermal loss (i.e. energy loss). Accordingly, the horizontal reactor is advantageous in energy efficiency. Furthermore, the arrangement of the deposition regions and the conversion regions in the reaction tube reduces the amount of final by-products with high energy efficiency, resulting in enhancement of silicon deposition efficiency, and reduces the number of downstream facilities for by-product disposal, thus contributing to the reduction of production cost.

While the present invention has been described with reference to the embodiments illustrated in the accompanying drawings, it will be understood by those skilled in the art that the embodiments are merely illustrative and various modifications and equivalents can be made to these embodiments. Therefore, the true scope of the present invention should be defined by the appended claims.

What is claimed is:

1. A polysilicon production apparatus, comprising:
   an insulated tube; and
   a horizontal reaction tube positioned in the insulated tube, the horizontal reaction tube having:
   an inlet port through which gaseous raw materials comprising reactant gases and a reducing gas are supplied to the horizontal reaction tube,
   an outlet port through which residual gases exit the horizontal reaction tube,
   a reaction surface with which the gaseous raw materials come into contact, and
   bottom openings through which molten polysilicon produced by the reactions of the gaseous raw materials is discharged from the reaction tube; and
   a first heater adapted to heat the reaction surface of the horizontal reaction tube,
   wherein the horizontal reaction tube comprises reaction regions consisting of first reaction regions where polysilicon is deposited and second reaction regions where reaction by-products are converted to the reactant gases, the first reaction regions being connected in series with the second reaction regions.

2. The polysilicon production apparatus according to claim 1, wherein the reaction temperature of the first reaction regions is controlled independently from that of the second reaction regions.

3. The polysilicon production apparatus according to claim 1, further comprising a polysilicon collection container adapted to collect the molten polysilicon discharged through the bottom openings of the horizontal reaction tube.

4. The polysilicon production apparatus according to claim 1, wherein the reactant gases comprise trichlorosilane (TCS), the reaction by-products comprise one or more of monosilane, monochlorosilane, dichlorosilane, and tetrachlorosilane (STC), and the reducing gas comprises hydrogen.

5. The polysilicon production apparatus according to claim 1, wherein the bottom openings of the horizontal reaction tube are formed in the first reaction regions.

6. The polysilicon production apparatus according to claim 1, wherein the first reaction regions and the second reaction regions of the horizontal reaction tube are alternately arranged and the last reaction region is occupied by the first reaction region.

7. The polysilicon production apparatus according to claim 1, wherein each of the second reaction regions further has an opening through which a reducing gas is supplied.

8. The polysilicon production apparatus according to claim 1, wherein the second reaction regions comprise a catalyst capable of promoting the conversion of the reaction by-products to the reactant gases.

9. The polysilicon production apparatus according to claim 8, wherein the catalyst is Si, SiC or a mixture thereof that provides no impurities during polysilicon deposition.

10. The polysilicon production apparatus according to claim 1, wherein the second reaction regions have internal structures to provide additional reaction surfaces.

11. The polysilicon production apparatus according to claim 3, wherein the polysilicon collection container comprises a second heater adapted to maintain the collected polysilicon in a molten state.

12. The polysilicon production apparatus according to claim 1, wherein the reaction surface is either the inner or outer surface of the horizontal reaction tube or both.

13. The polysilicon production apparatus according to claim 3, wherein the polysilicon is discharged in the form of droplets through the bottom openings of the horizontal reaction tube and is collected in the polysilicon collection container.

14. The polysilicon production apparatus according to claim 3, wherein the polysilicon collection container is positioned in the insulated tube.

15. A polysilicon production method, comprising:
feeding gaseous raw materials comprising reactant gases and a reducing gas through a gas inlet port into a first reaction region of a horizontal reaction tube, which is positioned in an insulated tube, and the horizontal reaction tube has reaction regions consisting of first reaction regions where polysilicon is deposited and second reaction regions where reaction by-products are converted to the reactant gases, the first reaction regions being connected in series with the second reaction regions;
heating the first reaction regions of the horizontal reaction tube to a reaction temperature of the gaseous raw materials to deposit polysilicon;
converting by-products of the reactions in the first reaction regions to the reactant gases in the second reaction regions and allowing the reactant gases to participate in polysilicon deposition; and
discharging the deposited polysilicon in the form of droplets through bottom openings of the horizontal reaction tube.

16. The polysilicon production method according to claim 15, further comprising collecting the discharged polysilicon in the form of droplets in a polysilicon collection container.

17. The polysilicon production method according to claim 16, further comprising heating the polysilicon collection container to maintain the collected polysilicon in a liquid state.

18. The polysilicon production method according to claim 15, wherein the first reaction regions are heated to a temperature suitable for polysilicon deposition and the second reaction regions are heated to a temperature suitable for the conversion of reaction by-products, the two temperatures being controlled independently from each other.

19. The polysilicon production method according to claim 15, further comprising:
supplying an additional reducing gas to the second reaction regions for the conversion of the reaction by-products in the absence of a catalyst; or
supplying a catalyst to the second reaction regions for the conversion of the reaction by-products.

20. The polysilicon production method according to claim 15, wherein:
the reactant gases comprise trichlorosilane;
the reaction by-products comprise one or more of monosilane, monochlorosilane, dichlorosilane, and tetrachlorosilane (STC); and
the reducing gas comprises hydrogen.

* * * * *